(12) United States Patent
Brown et al.

(10) Patent No.: US 10,719,504 B2
(45) Date of Patent: Jul. 21, 2020

(54) REFERENCE DATA TOOL

(71) Applicant: Accenture Global Solutions Limited, Dublin (IE)

(72) Inventors: Jason E. Brown, Atlanta, GA (US); Ashok Mishra, Maharashtra (IN); Samrajyam Chinnabathini, Telanga (IN); Bhuwanesh Sundriyal, Telangana (IN)

(73) Assignee: Accenture Global Solutions Limited, Dublin (IE)

( * ) Notice: Subject to any disclaimer, the term of this patent is extended or adjusted under 35 U.S.C. 154(b) by 894 days.

(21) Appl. No.: 15/373,936

(22) Filed: Dec. 9, 2016

(65) Prior Publication Data

US 2018/0075087 A1   Mar. 15, 2018

(30) Foreign Application Priority Data

Sep. 14, 2016  (IN) .............................. 201641031345

(51) Int. Cl.
*G06F 16/23* (2019.01)
*G06F 16/2455* (2019.01)

(52) U.S. Cl.
CPC ...... *G06F 16/2379* (2019.01); *G06F 16/2455* (2019.01)

(58) Field of Classification Search
CPC .. G06F 16/2379; G06F 16/2455; G06F 17/30; H04L 29/06

USPC ......................................................... 707/769
See application file for complete search history.

(56) References Cited

U.S. PATENT DOCUMENTS

| | | | |
|---|---|---|---|
| 2008/0052322 A1 | 2/2008 | Gusciora | |
| 2012/0330924 A1* | 12/2012 | Rajan | ................. G06F 16/2453 707/714 |
| 2014/0108132 A1* | 4/2014 | De Gour | ............ G06Q 30/0246 705/14.45 |

OTHER PUBLICATIONS

European Patent Office, Extended European Search Report from European Patent Application No. 17190943.5, date of completion of report Feb. 16, 2018, pp. 1-8.

Sherif, "Cloud-hosted databases: technologies, challenges and opportunities," Cluster Computing, vol. 17, No. 2 dated Jun. 1, 2014, pp. 487-502.

* cited by examiner

*Primary Examiner* — Hicham Skhoun
(74) *Attorney, Agent, or Firm* — Brinks Gilson & Lione

(57) ABSTRACT

A reference data tool helps meet the technical challenges associated with providing important data to an application that needs the data. The tool causes execution of custom reports on an external data platform that extract the data needed by the application from the external data platform. The tool creates a custom data store for the data in a location accessible to the application. After the tool receives the extracted data, the tool automatically writes the data into the proper location in the custom data store.

20 Claims, 8 Drawing Sheets

End Point URL: https://<server:port>/ERPCloudIntegrationsOutboundADFServiceApp/ERPCloudIntegrationsOutboundService?wsdl

Webservice Payload With Parameters :

```
<soap:Envelope xmlns:soap="http://schemas.xmlsoap.org/soap/envelope/">
  <soap:Body>
    <ns1:runReport xmlns:ns1="/erp/cloud/outbound/integrations/model/applicationModule/ERPCloudIntegrationsOutboundService/types/">
      <ns1:reportFormat>csv</ns1:reportFormat>
      <ns1:reportAbsolutePath>/Financials/General Ledger/Journals/Bhuwan_GL_CODE_COMBINATIONS.xdo</ns1:reportAbsolutePath>
      <ns1:reportOutputFile>/customer/scratch/INT_ERP_LOOKUPS_DUMMY.csv</ns1:reportOutputFile>
      <ns1:uploadTableRequired>Y</ns1:uploadTableRequired>
      <ns1:completeRefresh></ns1:completeRefresh>
    </ns1:runReport>
  </soap:Body>
</soap:Envelope>
```

Figure 5

REFERENCE DATA TOOL

PRIORITY CLAIM

This application claims priority to India non-provisional application serial number 201641031345, filed Sep. 14, 2016, entitled Reference Data Tool, which is entirely incorporated by reference.

TECHNICAL FIELD

This application relates to data architectures, and to a data tool that provides access to data that applications need to reference during their execution.

BACKGROUND

Computer systems today possess unprecedented levels of processing power, memory, volume storage, and other resources, not only in locally implemented hardware, but also in remotely implemented systems, e.g., in cloud hosted systems. Interconnected networks of physical and virtual computer systems are deployed in almost every conceivable scenario worldwide and execute applications that carry out an immense variety tasks ranging from the mundane to the mission critical. Improvements in data architectures will enhance the ability of these applications to access and operate on the data they need to perform their functions.

BRIEF DESCRIPTION OF THE DRAWINGS

FIG. 5 shows an example reference web service call.

DETAILED DESCRIPTION

A reference data tool ("RDT") helps meet the technical challenges associated with providing important data to an application that needs the data. The tool causes execution of custom reports on an external data platform that extracts the data needed by the application from the external data platform. The tool creates a custom data store for the data in a location accessible to the application. After the tool receives the extracted data, the tool automatically writes the data into the proper location in the custom data store. The external data platform is generally difficult or impossible for the application to reach directly, and the tool provides a data flow intermediary that facilitates access to the data that the application needs.

The Figures discussed below provide example contexts, implementations, and features for the technical solutions in the RDT. The Figures show specific examples out of many possible different implementations and implementation contexts. In that respect, the technical solutions are not limited in their application to the architectures and systems shown in any of the Figures discussed below, but are applicable to many other system implementations, architectures, user interfaces, features, and connectivity.

Figure 1:
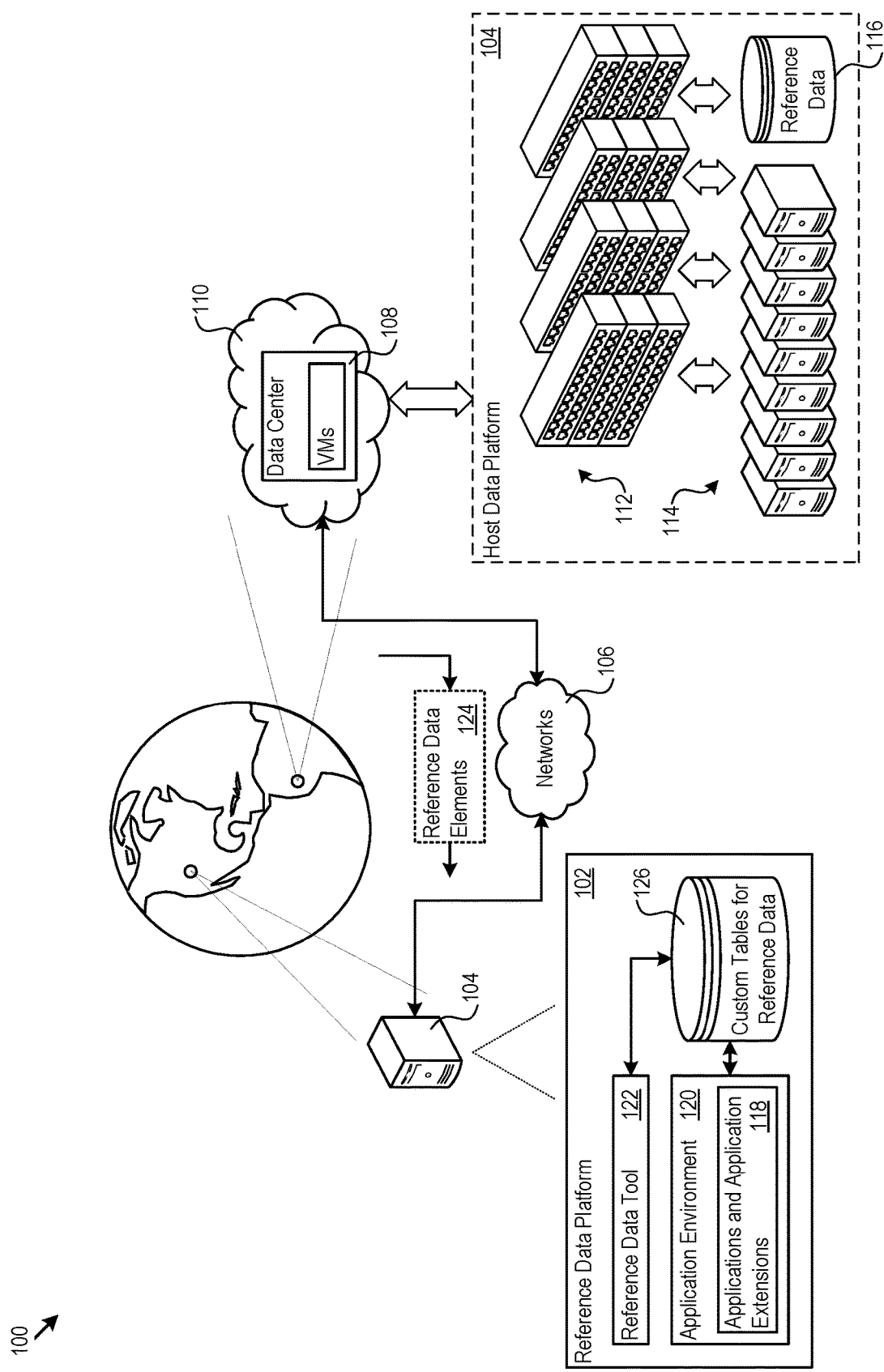
FIG. 1 shows a network architecture in which application extensions execute locally with access to reference data provided by an reference data tool running in a reference data platform.

FIG. 1 shows a network architecture 100 in which applications and application extensions execute locally with access to reference data provided by a reference data tool. In more detail, a reference data platform 102 connects to a host data platform 104 through one or more networks 106. The host data platform 104 may be a cloud-based data platform hosted in a data center 108 operated by a cloud provider 110, for instance, to provide software as a service (SaaS). To that end, the host data platform 104 may include a wide range of networking infrastructure 112 that hosts, executes, and manages any number of virtual machines 114 for any number of enterprise subscribers. The virtual machines 114, in turn, execute virtualized applications that read, write, and modify reference data 116 during normal operation of the applications. As just a few examples, the applications may be enterprise resource management (ERP) applications, financials applications, human resources (HR) applications, risk management (RM) applications, project management (PM) applications, or customer experience (CX) applications. The host data platform 104 may take many other forms, however, including other types of cloud based implementations and local or private on-premises installations (e.g., at any given enterprise office location worldwide) in which the applications and reference data 116 are not virtualized.

The reference data platform 102 may offer platform as a service (PaaS) that supports the execution of applications and application extensions 118 ("local applications 118") in an application environment 120. The application environment 120 may include, e.g., a hardware execution platform, operating system, memory and disk space resources. The local applications 118 execute remotely from the host data platform 104. The execution may be considered remote in one sense in that the local applications 118 do not execute within the same execution environment as the applications running on the host data platform 104. The execution may be considered remote in another sense in that the host data platform 104 does not provide native application programming interfaces (APIs) or other communication channels through which the local applications 118 may access the reference data 116. That is, the local applications 118 may not have direct access to the reference data 116. In many instances, the local applications 118 extend the functionality of the applications running in the host data platform 104 and need to access the reference data 116 to accomplish their tasks.

The reference data platform 102 facilitates access by the local applications 118 to the reference data 116. To that end, the reference data platform 102 implements a reference data tool 122. As will be described in detail below, the RDT 122 efficiently captures snapshots of the reference data 116 and replicates reference data elements 124 from the reference data 116 in custom tables 126. The reference data elements 124 may be data fields, rows, records, tables, or any other data stored in the reference data 116.

The custom tables 126 are directly available to the local applications 118, e.g., via a database management system (DBMS) connection, API, or Web service interface. As a result, the local applications 118 may carry out their processing even though the host data platform 104 does not provide communication channels through which the local applications 118 can access the reference data 116 natively stored in the host data platform 104.

Figure 2:
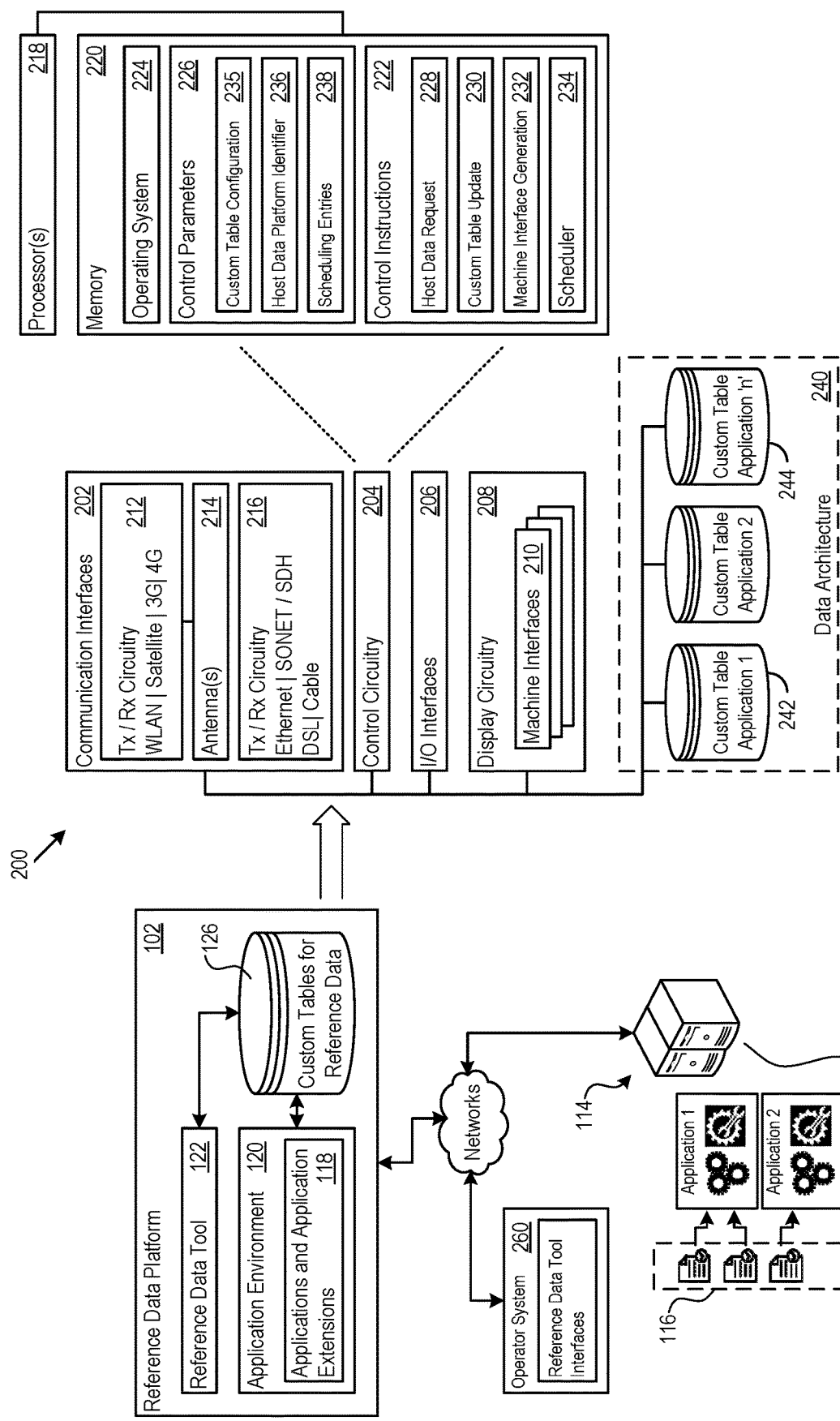
FIG. 2 shows one example implementation of the reference data platform.

FIG. 2 shows one example implementation 200 of the reference data platform 102. The system architecture may vary widely, and may be based on, for instance, an Intel Xeon processor E7-8800/4800 v3 platform for real-time processing of volume data workloads. The example implementation 200 includes communication interfaces 202, control circuitry 204, and input/output (I/O) interfaces 206. The example implementation 200 also includes display circuitry 208 that generates machine interfaces 210 locally or for remote display, e.g., in a web browser running on a local or remote operator machine 260. The machine interfaces 210 and the I/O interfaces 206 may include GUIs, touch sensitive displays, voice or facial recognition inputs, buttons, switches, speakers and other user interface elements.

The communication interfaces 202 may include wireless transmitters and receivers ("transceivers") 212 and any antennas 214 used by the transmit and receive circuitry of the transceivers 212. The transceivers 212 and antennas 214 may support WiFi network communications, for instance, under any version of IEEE 802.11, e.g., 802.11n or 802.11ac. The communication interfaces 202 may also include physical transceivers 216. The physical transceivers 216 provide physical layer interfaces for any of a wide range of communication protocols, such as any type of Ethernet, data over cable service interface specification (DOCSIS), digital subscriber line (DSL), Synchronous Optical Network (SONET), or other protocol.

The control circuitry 204 may include hardware, software, firmware, or other circuitry in any combination. The control circuitry 204 may be implemented, for example, with one or more systems on a chip (SoC), application specific integrated circuits (ASIC), microprocessors, discrete analog and digital circuits, and other circuitry. The control circuitry 204 is part of the implementation of any desired functionality in the reference data platform 102. As just one example, the control circuitry 204 may include one or more instruction processors 218 and memories 220. The memory 220 stores, for example, control instructions 222 and an operating system 224. The processor 218 executes the control instructions 222 and the operating system 224 to carry out any desired functionality for reference data platform 102, according to the configuration and control parameters 226.

The control instructions 222 may include host data request instructions 228, custom table update instructions 230, machine interface generation instructions 232, and a scheduler 234. The control parameters 226 provide and specify configuration and operating options for the control instructions 222, operating system 224, and other functionality of the reference data platform 102. As examples, the control parameters 226 may include custom table configurations 235, host data platform identifiers 236, and scheduling entries 238, all of which may differ on a per-host data platform application basis.

The implementation 200 also a data architecture 240. The data architecture 240 defines storage mechanisms for data elements obtained from the host data platform 104. The storage mechanisms may include any number of custom tables for reference data, e.g., the custom tables 242 and 244. In one implementation, a DBMS maintains and controls the custom tables.

With regard again to the control parameters 226, examples of custom table configurations include: name, locations, and access permissions of the custom tables; associations of the custom table that link the custom tables to any particular local application 118; and custom table setup specifications of column or field name, column order, field type, and field length and other characteristics. Examples of host data platform identifiers 236 include uniform resource indicators (URIs) and access credentials.

Examples of scheduling entries 238 include time, date, and frequency specifiers for retrieving the reference data elements 124 from the host data platform 104, e.g., once per week at 4 am starting 1 Sep. 2016, in any format accepted by the scheduler 234.

Figure 3:
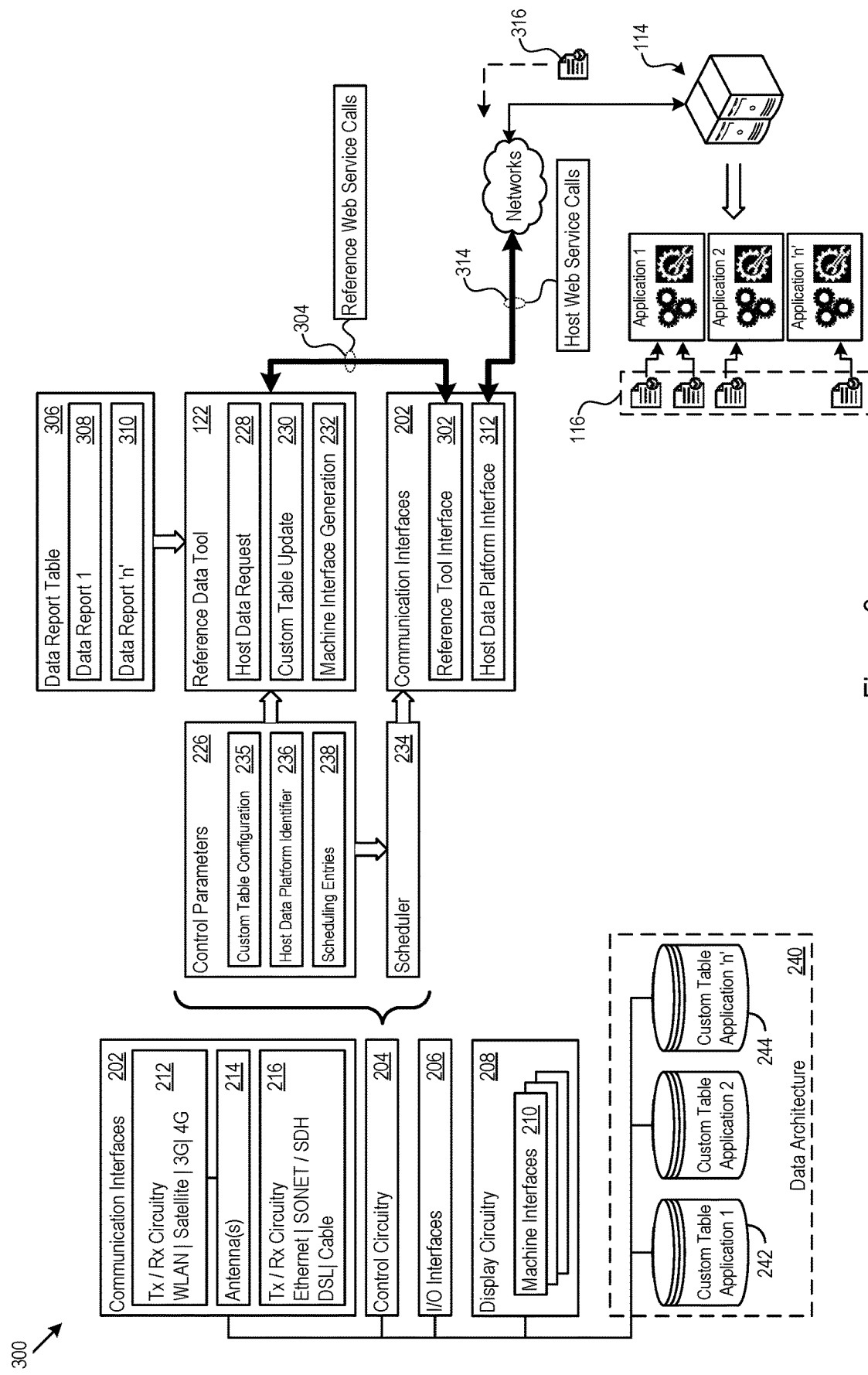
FIG. 3 shows another example implementation of the reference data platform.
Figure 4:
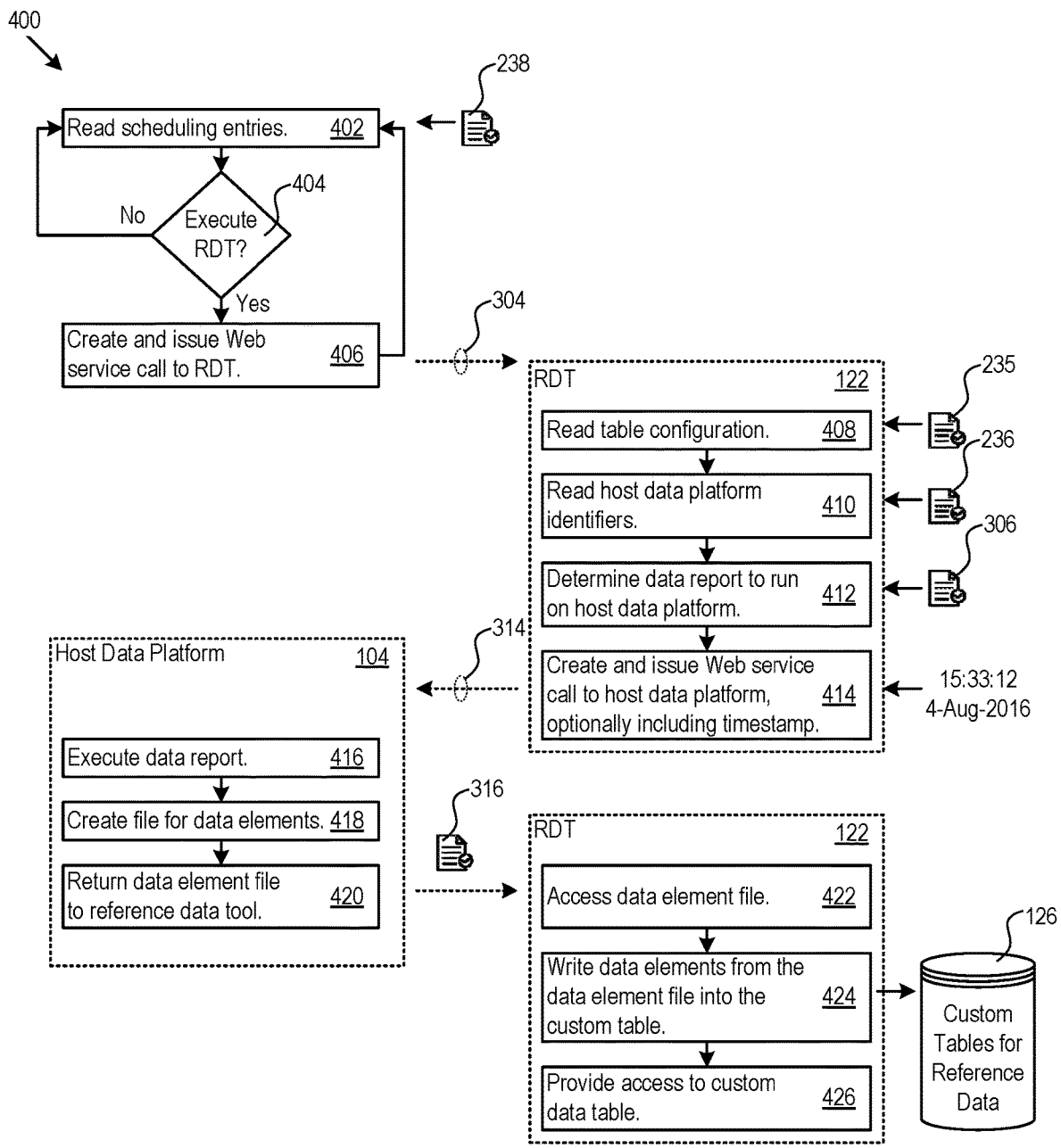
FIG. 4 shows logic for providing reference data to local applications via a reference data tool.

FIG. 3 shows another example implementation 300 of the reference data platform 102. FIG. 3 is discussed in conjunction with FIG. 4, which shows logic 400 that the scheduler 234, RDT 122, and host data platform 104 may implement and execute to provide reference data to local applications 118. The scheduler 234 reads its scheduling entries 238 (402) and determines when to invoke the RDT 122 (404) responsive to the scheduling entries 238.

In one implementation, the reference data platform 102 defines a reference tool interface 302 for communications with the RDT 122. The reference tool interface 302 may be, for instance, a Web service interface through which the scheduler 234 invokes the RDT 122. To that end, the scheduler 234 creates and issues reference Web service calls 304 (406). In other implementations, the reference tool interface 302 may be a remote procedure call, subroutine call, or other function execution mechanism.

The RDT 122 reads the table configuration 235 (408) and the host data platform identifiers 236 (410). The RDT 122 thereby determines where and how to connect to the host data platform 104. The table configuration 235 informs the RDT 122 as to what columns and in what order the data elements will be returned from the host data platform 104.

To obtain the data elements for any given local application 118, the RDT 122 may access a data report table 306. The data report table 306 maintains identifiers of pre-defined data reports, e.g., the data report identifiers 308 and 310. The pre-defined data reports are created and saved on the host data platform 104, and control what data elements will be returned and in what order from the host data platform 104. The data reports may also specify, e.g., the filename of a file in which the data elements are returned (e.g., in comma separated value (CSV) form) from the host data platform 104 after it executes the data report.

In one implementation, the reference data platform 102 defines a host data platform interface 312 for communications with the host data platform 104. The host data platform interface 312 may be, for instance, a Web service interface. In other implementations, the data platform interface 312 may be a remote procedure call, subroutine call, or other function execution mechanism.

Through the host data platform interface 312, the RDT 122 requests the host data platform 104 to execute a data report and return data elements to the RDT 122. In that regard, the RDT 122 determines which data report to run (412), and creates and issues a host Web service call 314 that specifies the data report (414). The reference Web service call 304 from the scheduler 234 may specify the data report, or may specify the local application 118 which is associated to a data report in the data report table 306.

The RDT 122 may also include a timestamp in the host Web service call 314, e.g., a timestamp defining the time of last update to the custom table at issue. Any of the pre-defined data reports may be written to be responsive to the timestamp by determining data changes in the data elements in the host data platform 104 after the timestamp, and returning only the changes. The RDT 122 may then incrementally update the custom data table with the new data elements. This reduces bandwidth consumed and processing time spent keeping the custom tables up to date.

The host data platform 104 receives the host Web service call 314, and executes the specified data report (416). The data report queries the host reference data 116 and obtains the responsive data elements. The host data platform 104 writes the responsive data elements to a data file 316 (418), e.g., in CSV form, including a first row of column identifiers.

The host data platform 104 returns the data file 316 to the RDT 122 (420). In turn, the RDT 122 accesses the data file 316 (422) and writes the data elements in the data file into the corresponding columns in the custom table (424). The reference data platform 102 provides access to the custom data tables to the local applications 118 (426). As one example, the reference data platform 102 may expose the custom data tables over a representational state transfer (REST) service or Web service so that any local application 118 can query that table. As another example, the custom tables may be part of the application architecture within a local application 118, so that the local application 118 has direct access to the custom table. A local application may include any application for which data is obtained from the host data platform 104. For example, a local application may include an application running in whole or in part on a mobile device in data communication with the reference data platform 102, a distributed application running on cloud-based hardware in data communication with the reference data platform, an application accessing the custom data tables over the REST service or Web service, or other application in communication with the reference data platform 102.

FIG. 5 shows an example reference Web service call 500 to the RDT 122. As noted above, the RDT 122 may expose a Web service and use it to receive input parameters from the scheduler 234 via the reference Web service calls 304, responsively perform the logic described above, and make the host Web service calls 314. FIG. 5 shows an example end point URL 502 for the RDT 122, the Web service payload 504, and the Web service parameters 506. Table 1, below, explains the Web service parameters for the reference Web service calls.

TABLE 1

Web Service Parameters for Host Web Service Calls

| Parameter | Explanation |
| --- | --- |
| reportFormat | File Format in which to extract the report output. Example csv, pdf. |
| reportAbsolutePath | Absolute path of the custom report in the host data platform. Indicates which custom report to run. |
| reportOutputFile | Full path of the output file where extracted data will be stored. |
| uploadTableRequired | "Y" indicates custom table in the reference data platform that needs to be uploaded with the extracted records. "N" or blank value indicates only data extraction is intended, uploading custom table is not required. |
| completeRefresh | "Y" indicates full data extraction is required, rather than an incremental update. |

Figure 6:
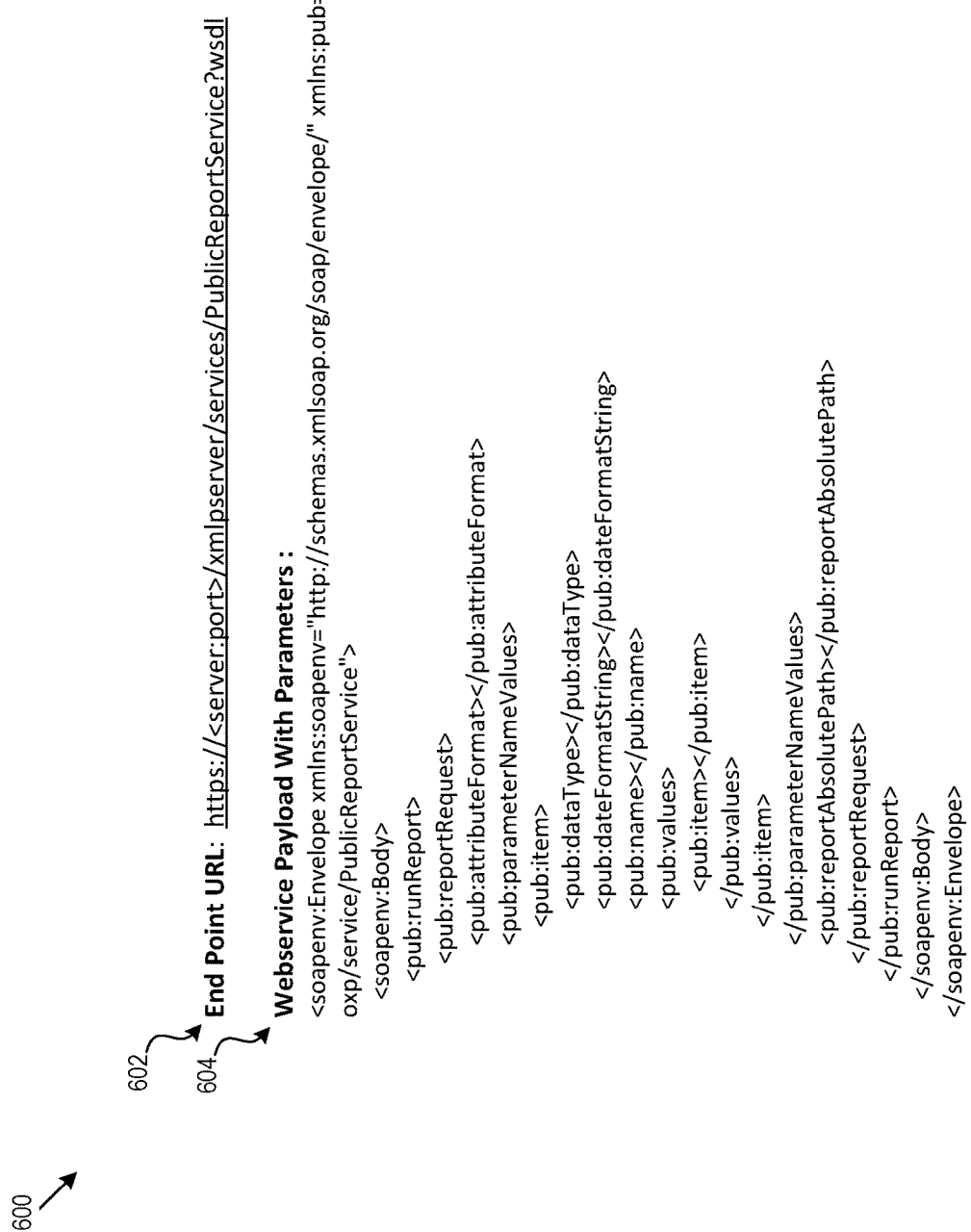
FIG. 6 shows an example host web service call.

FIG. 6 shows an example host web service call 600 to the host data platform 104. As noted above, the host data platform 104 may expose a Web service and use it to receive input parameters from the RDT 122 via the host Web service calls 314, responsively perform the logic described above, and return reference data to the RDT 122. FIG. 5 shows an example end point URL 602 for a server in the host data platform 104, the Web service payload 604, and the Web service parameters. Table 2, below, explains the Web service parameters for the host Web service calls.

TABLE 2

Web Service Parameters for Host Web Service Calls

| Parameter | Explanation |
| --- | --- |
| attributeFormat | File Format in which to extract the report output. Examples include. csv, and. pdf. |
| parameterNameValues | Report parameter name and value pair. The RDT creates a report parameter with the Date, and passes the current date from the RDT, which filters the report data based on that date. This ensures latest data is extracted out of host data platform for an incremental update. |
| reportAbsolutePath | Absolute path of the custom report in the host data platform. Indicates which custom report to run. |

Figure 7:
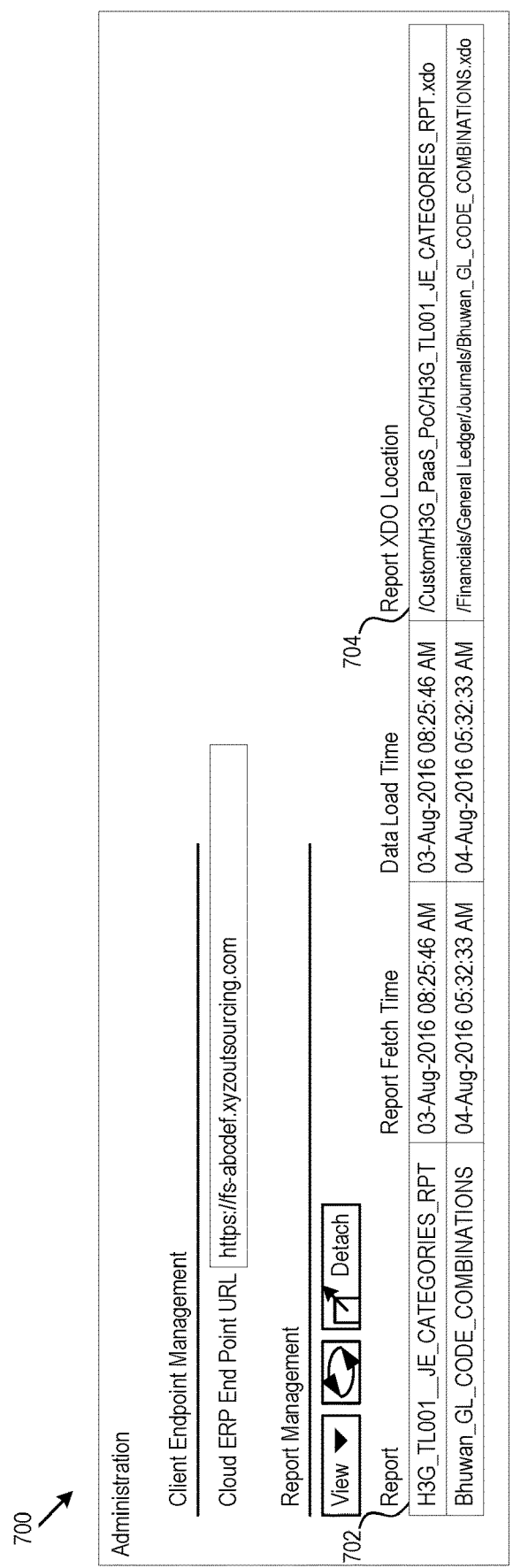
FIG. 7 shows a report configuration interface.

FIG. 7 shows a report configuration interface 700 that the RDT 122 may implement, e.g., as one of the machine interfaces 210. The report configuration interface 700 facilitates specifying data reports and the server on which they run. For example, the Report field 702 provides a name for the data report, e.g., "H3G_TL001_JE_CATEGORIES_RPT". The location field 704 provides a path to the data report, e.g., "/Custom/H3G PaaS PoC/H3G_TL001_JE_CATEGORIES_RPT.xdo".

Figure 8:
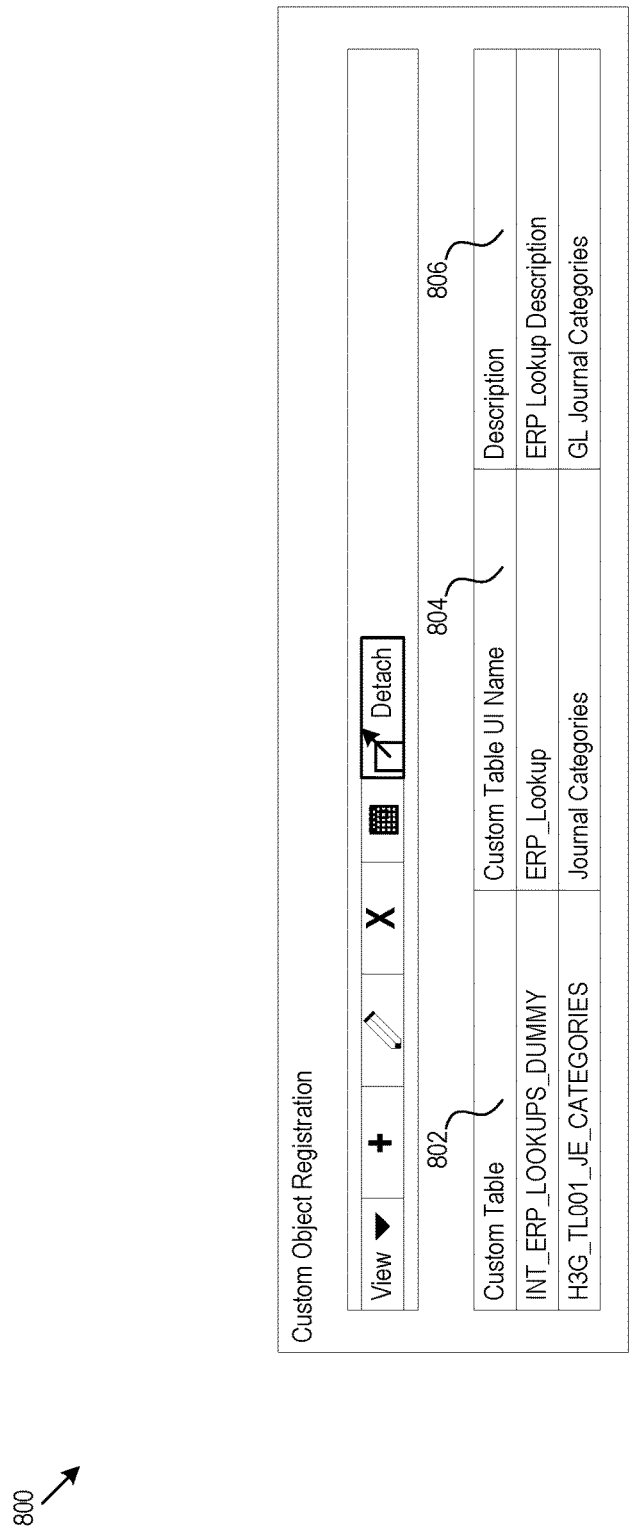
FIG. 8 shows a custom object registration interface.

FIG. 8 shows a custom object registration interface 800 that the RDT 122 may implement, e.g., as one of the machine interfaces 210. The custom object registration interface 800 facilitates defining and identifying custom tables for reference data. In the example of FIG. 8, the custom table field 802 provides a custom table name, the custom table user interface name field 804 provides an identifier of the user interface to generate when reviewing the data in the custom table, and the description field 808 provides a description of the custom table.

Expressed another way, the RDT 122 runs in a reference data platform 102. The RDT 122 includes machine interface circuitry (e.g., the communication interfaces 202) that receives a host identifier of a host data platform external to the reference data platform and a data table identifier for a local data table. The RDT 122 access a local database within the reference data platform 102. The local database defines a local data table, e.g., any of the custom tables described above.

Reference data control circuitry (e.g., the control circuitry 204) within the reference data platform 102 establishes a data connection between the reference data platform 102 and the host data platform 104. The reference data control circuitry issues a request over the data connection to the host data platform 104 for data elements stored in the host data platform 104, reproduces the data elements in the host data platform in the local data table, and provides access to the local data table for local application 118 that refers to the data elements during execution.

The reference data control circuitry may be further configured to receive an identification of the data elements prior to establishing the data connection and determine a data query against the host data platform that will return the data elements to the reference data platform. The data query may be a data report configured for execution by the host data platform to output the data elements, and the reference data control circuitry may be further configured to instantiate, save, or configure the data report on the host data platform prior to establishing the data connection.

The request may be an execution request that the host data platform 104 execute the data report. The request may be in the form of a Web service call to the host data platform 104, including a report identifier corresponding to the data report that was created on the host data platform prior to establishing the data connection. The Web service call may further include a timestamp. In that regard, any data report may be configured to be responsive to the timestamp by determining data changes in the data elements in the host data platform after the timestamp. The reference data control circuitry may then incrementally update the local data table with the data changes, rather than, e.g., completely recreating all of the data on each request.

The reference data platform 102 may request scheduling circuitry (e.g., the scheduler 234) to add scheduling entries 238 to the request scheduler. The request scheduling circuitry may then initiate obtaining the reference data elements 124 by issuing the requests when specified by the scheduling entries. As noted above, the scheduling circuitry may invoke the reference tool interface 302, which in turn causes the RDT 122 to invoke the host data platform interface 312.

Described yet another way, in a reference data platform 102, machine interface circuitry is configured to receive a host identifier of a host data platform external to the reference data platform and a data table identifier for a local data table. A local database includes the local data table and is configured to store data elements obtained from the host data platform. The reference data platform 102 includes request scheduling circuitry configured to add a pre-determined update schedule in the request scheduler for obtaining the data elements and issue an update request at a time determined by the pre-determined update schedule. In addition, the reference data platform 102 includes reference data control circuitry configured to instantiate a data report on the host data platform for communicating the data elements to the reference data platform, receive the update request from the scheduling circuitry, establish a data connection between the reference data platform and the host data platform, issue a data request over the data connection to the host data platform for the data elements stored in the host data platform, and update the local data table with the data elements received from the host data platform.

Note that the reference data platform 102 may include communication interface circuitry configured to execute a host data platform Web service call to the host data platform to issue the data request. The host data platform Web service call may include a report identifier corresponding to the data report that was instantiated on the host data platform prior to establishing the data connection, and a timestamp for the data report. The data report is configured to be responsive to the timestamp by determining data changes in the data elements in the host data platform after the timestamp. The communication interface circuitry is also configured to execute a reference data platform Web service call to the reference data control circuitry to issue the update request, where the reference data platform Web service call initiates the update to the data table when specified by the pre-determined update schedule. The reference data control circuitry incrementally updates the local data table with the data changes.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

What is claimed is:

1. A system comprising:
in a reference data platform:
machine interface circuitry configured to receive:
   a host identifier of a host data platform external to the reference data platform; and
   a data table identifier for a local data table;
a local database within the reference data platform, the local database comprising the local data table configured to store data elements obtained from the host data platform;
request scheduling circuitry configured to:
   create a pre-determined update schedule for the request scheduling circuitry to respond to, for obtaining the data elements; and
   issue an update request at a time determined by the pre-determined update schedule; and
reference data control circuitry within the reference data platform, the reference data control circuitry configured to:
   instantiate a data report on the host data platform for communicating the data elements to the reference data platform;
   generate a listing of the data report in a data report table;
   after generating the listing, receive the update request from the request scheduling circuitry;
   determining a data query against the host data platform that will return the data elements to the reference data platform by specifying, via a data report table, the data report for execution by the host data platform responsive to the identification of the data elements;
   establish a data connection between the reference data platform and the host data platform;
   issue a data request over the data connection to the host data platform for the data elements stored in the host data platform; and
   update the local data table with the data elements received from the host data platform.

2. The system of claim 1, further comprising:
communication interface circuitry configured to:
   execute a host data platform Web service call to the host data platform to issue the data request, where the host data platform Web service call comprises:
      a report identifier corresponding to the data report that was instantiated on the host data platform prior to establishing the data connection; and
      a timestamp for the data report, the data report configured to be responsive to the timestamp by determining data changes in the data elements in the host data platform after the timestamp; and
   execute a reference data platform Web service call to the reference data control circuitry to issue the update request, where the reference data platform Web service call initiates the update to the local data table when specified by the pre-determined update schedule;
and where:
the reference data control circuitry is further configured to incrementally update the local data table with the data changes.

3. A method comprising:
receiving, at a reference data platform, a host identifier of a host data platform external to the reference data platform;
receiving a data table identifier for a local data table;
instantiating a local database within the reference data platform, the local database comprising the local data table;
receiving an identification of data elements stored in the host data platform;
determining a data query against the host data platform that will return the data elements to the reference data platform by specifying, via a data report table, a predefined data report for execution by the host data platform responsive to the identification of the data elements;
after receiving the identification, establishing a data connection between the reference data platform and the host data platform;
issuing a request over the data connection to the host data platform for the data elements;
reproducing the data elements from the host data platform in the local data table; and
providing access to the local data table for an application that refers to the data elements during execution.

4. The method of claim 3, further comprising:
defining a reference data platform Web service for obtaining the data elements;
executing a request scheduler;
adding a scheduling entry in the request scheduler for obtaining the data elements; and
issuing the request according to the scheduling entry by invoking the reference data platform Web service.

5. The method of claim 3, where the data report table includes identifiers for multiple data reports including the predefined data report.

6. The method of claim 5, where the multiple data reports are created and stored on the host data platform.

7. The method of claim 3, where:
issuing the request comprises: issuing an execution request that the host data platform execute the predefined data report.

8. The method of claim 7, where:
issuing the request comprises: making a Web service call to the host data platform.

9. The method of claim 8, where:
the Web service call comprises a report identifier corresponding to the predefined data report that was created on the host data platform prior to establishing the data connection.

10. The method of claim 9, where:
the Web service call further comprises a timestamp;
the predefined data report is configured to be responsive to the timestamp by determining data changes in the data elements in the host data platform after the timestamp; and
the reference data platform incrementally updates the local data table with the data changes.

11. The method of claim 8, where the data table is further configured to specify a local application for execution of the data report in response to the Web service call.

12. A system comprising:
machine interface circuitry in a reference data platform configured to receive:
  a host identifier of a host data platform external to the reference data platform; and
  a data table identifier for a local data table;
a local database within the reference data platform, the local database comprising the local data table; and
reference data control circuitry within the reference data platform, the reference data control circuitry configured to:
  receive an identification of data elements stored in the host data platform;
  determine a data query against the host data platform that will return the data elements to the reference data platform by specifying, via a data report table, a predefined data report for execution by the host data platform responsive to the identification of the data elements;
  after receiving the identification, establish a data connection between the reference data platform and the host data platform;
  issue a request over the data connection to the host data platform for the data elements;
  reproduce the data elements from the host data platform in the local data table; and
  provide access to the local data table for an application that refers to the data elements during execution.

13. The system of claim 12, where:
the request comprises an execution request that the host data platform execute the predefined data report.

14. The system of claim 13, where:
the request comprises a Web service call to the host data platform.

15. The system of claim 14, where:
the Web service call comprises a report identifier corresponding to the predefined data report that was created on the host data platform prior to establishing the data connection.

16. The system of claim 15, where:
the Web service call further comprises a timestamp;
the predefined data report is configured to be responsive to the timestamp by determining data changes in the data elements in the host data platform after the timestamp; and
the reference data control circuitry is further configured to incrementally update the local data table with the data changes.

17. The system of claim 14, where the data table is further configured to specify a local application for execution of the data report in response to the Web service call.

18. The system of claim 12, further comprising:
a reference data platform Web service for obtaining the data elements;
request scheduling circuitry configured to:
  add a scheduling entry to read by the request scheduling circuitry for obtaining the data elements; and
  issue the request according to the scheduling entry by invoking the reference data platform Web service.

19. The system of claim 12, where the data report table includes identifiers for multiple data reports including the predefined data report.

20. The system of claim 19, where the reference data control circuitry is configured to create and store the multiple data reports on the host data platform.

* * * * *